(12) United States Patent
Baker et al.

(10) Patent No.: US 6,231,027 B1
(45) Date of Patent: May 15, 2001

(54) HIGH TORQUE ROTATING ACTUATOR

(75) Inventors: Gerald S. Baker, Houston, TX (US);
David Garnham, Leeds; Brian Hart,
Wakefield, both of (GB); **Danny K.
Wolff**, Houston, TX (US)

(73) Assignee: Cooper Cameron Corporation,
Houston, TX (US)

( * ) Notice: Subject to any disclaimer, the term of this patent is extended or adjusted under 35 U.S.C. 154(b) by 0 days.

(21) Appl. No.: 09/156,251

(22) Filed: Sep. 18, 1998

(51) Int. Cl.⁷ .............................. F16K 31/12; F01B 9/06
(52) U.S. Cl. .................................. 251/58; 92/136; 74/57; 74/89.15
(58) Field of Search ............................. 92/136; 251/58; 74/57, 59, 89.15, 99 R

(56) References Cited

U.S. PATENT DOCUMENTS

| | | | |
|---|---|---|---|
| 2,612,312 | * | 9/1952 | Clarke ........................................ 74/57 |
| 3,298,659 | * | 1/1967 | Cupedo ................................... 251/58 |
| 3,391,722 | * | 7/1968 | Ligh .......................................... 92/31 |
| 4,504,038 | * | 3/1985 | King ........................................ 251/58 |
| 4,838,102 | * | 6/1989 | Bode et al. ............................... 92/31 |
| 4,925,154 | | 5/1990 | Baker ...................................... 251/58 |
| 5,134,923 | * | 8/1992 | Wexler ..................................... 92/31 |
| 5,447,095 | * | 9/1995 | Weyer ................................... 92/136 |
| 6,032,920 | * | 3/2000 | Takahashi et al. ...................... 251/58 |

OTHER PUBLICATIONS

"The Cameron ½" 10,000 psi WP Half–Turn Manual Gate Valve, Apr. 1988, 2 Pages.

* cited by examiner

*Primary Examiner*—F. Daniel Lopez
(74) *Attorney, Agent, or Firm*—Jackie Lee Duke

(57) ABSTRACT

A high torque rotating actuator is disclosed. The high torque rotating actuator has a variable helix angle that allows the actuator to generate greater torque near the end of its travel when it is needed to close a valve or operate a choke. The high torque rotating actuator is designed for use with valves and chokes. In a second embodiment, a high torque rotating actuator is configured to give a shorter overall assembly. As in the preferred embodiment, a variable helix angle is used to generate greater torque near the end of its travel when it is needed to close a valve or operate a choke.

9 Claims, 16 Drawing Sheets

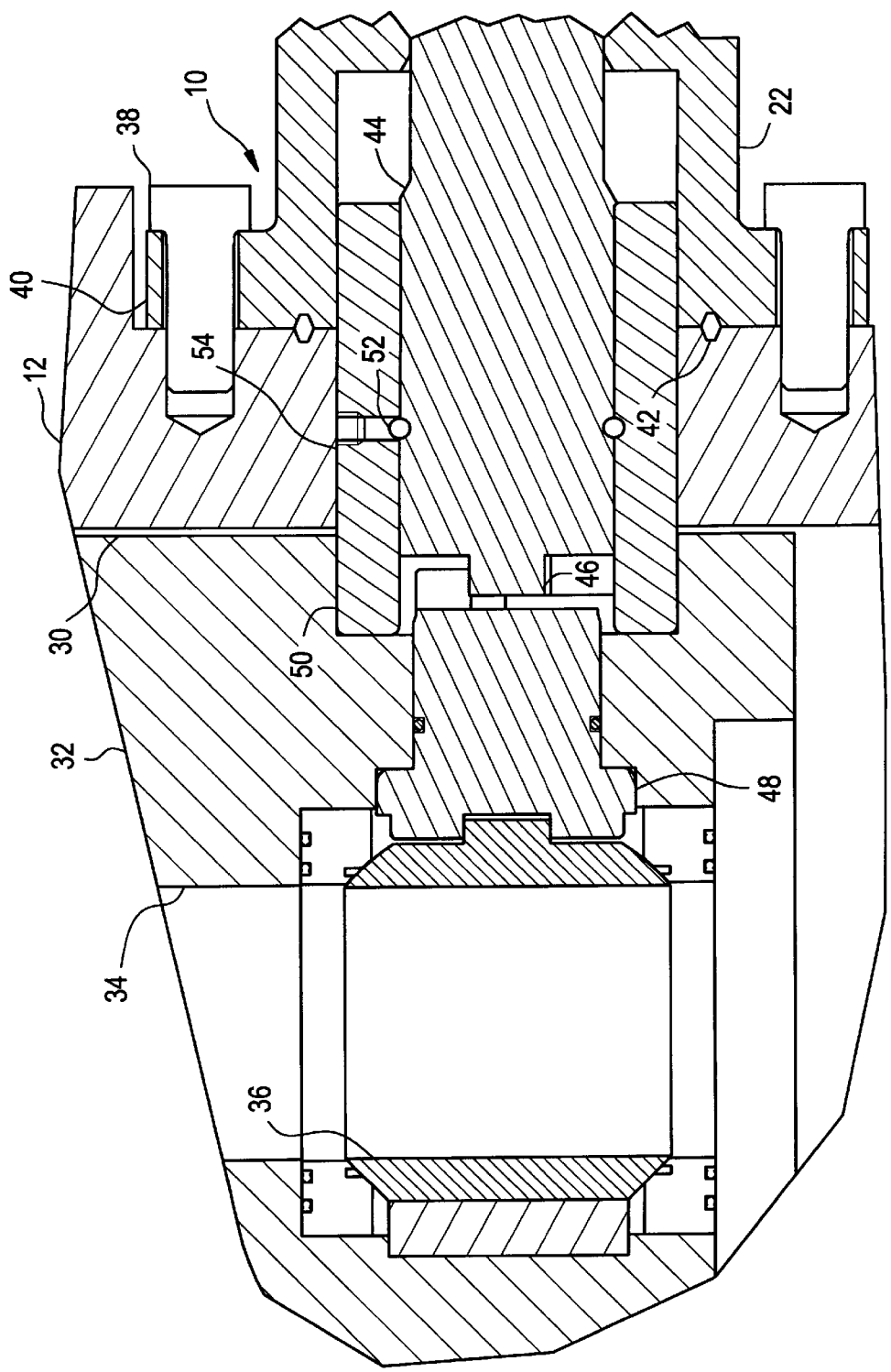

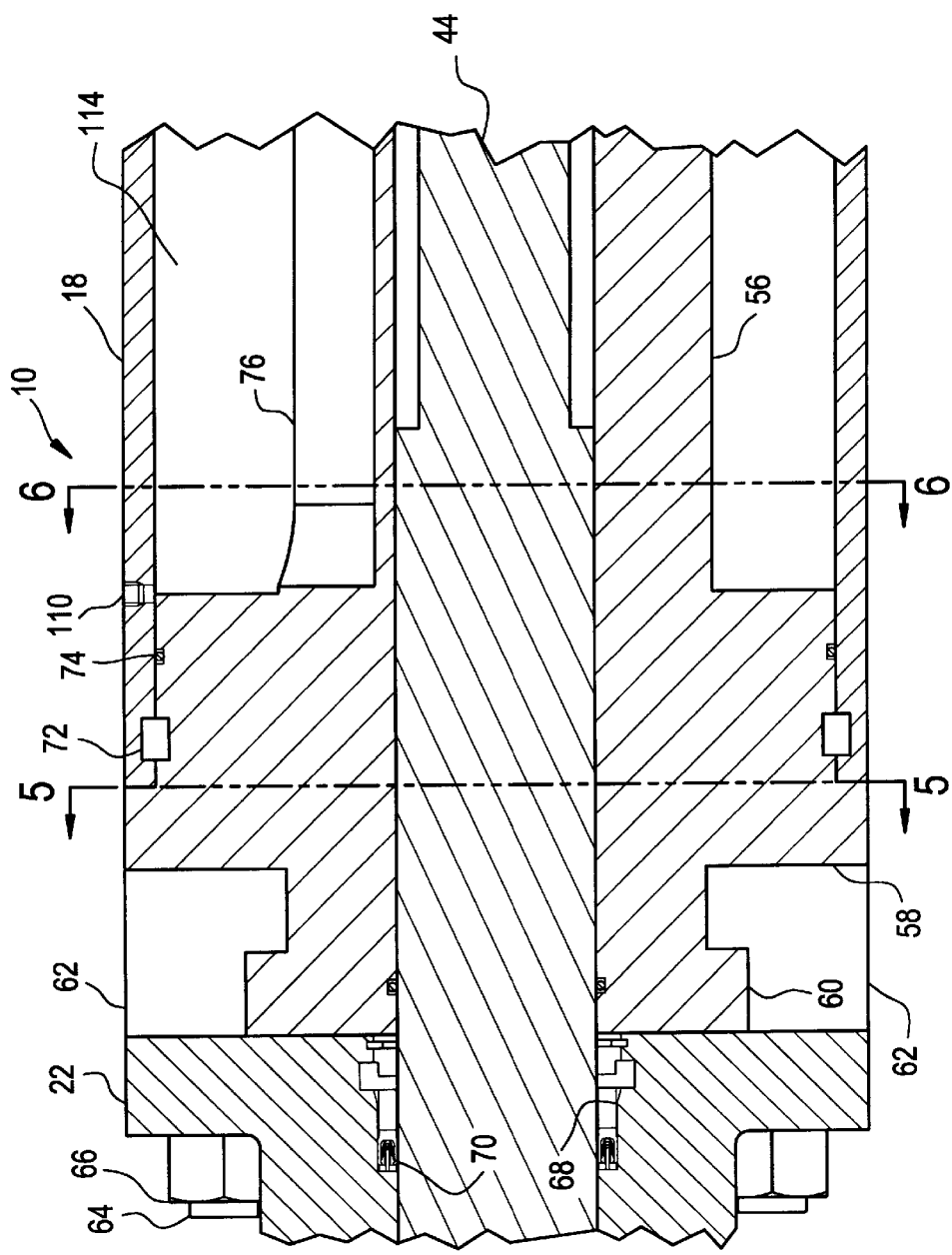

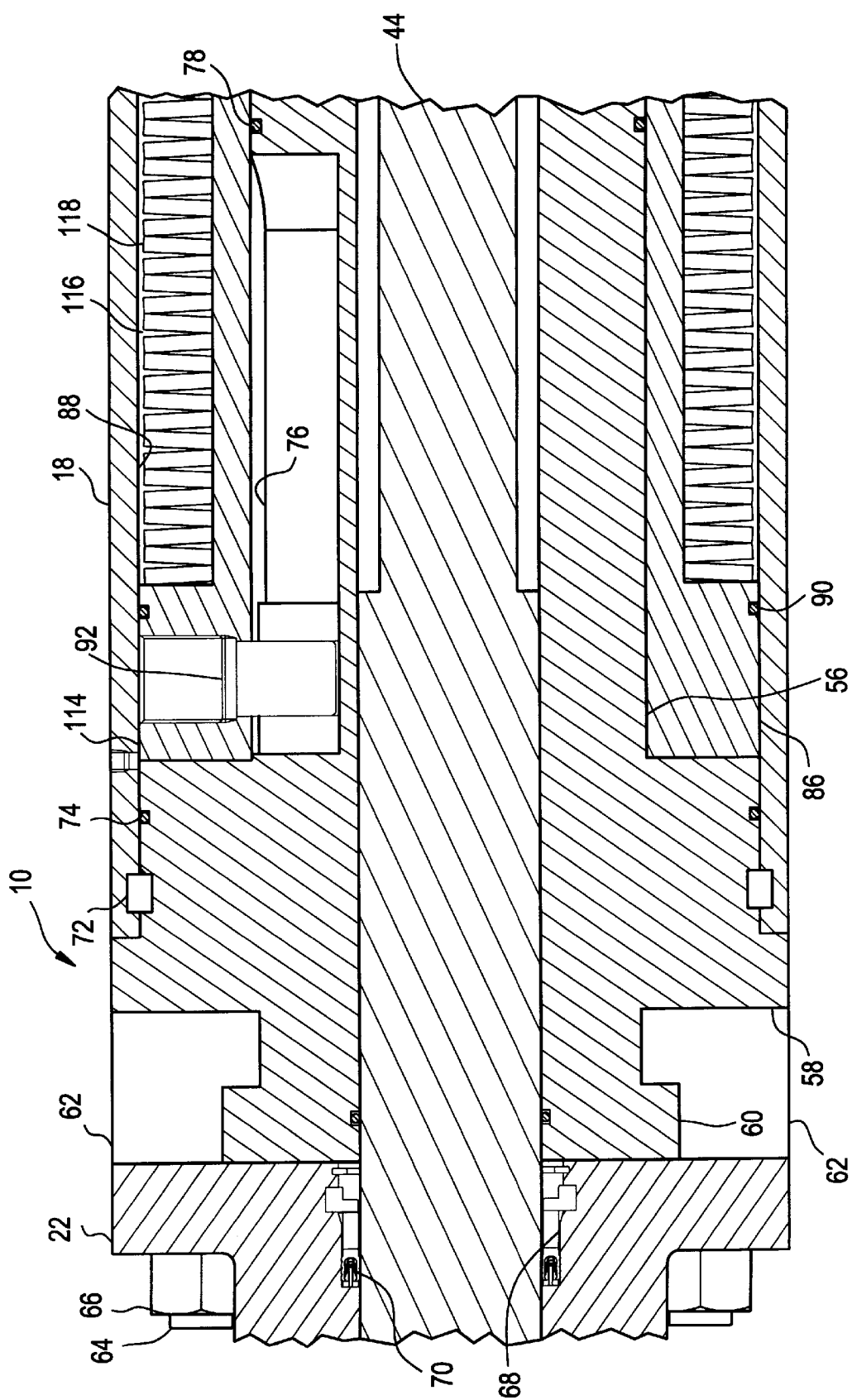

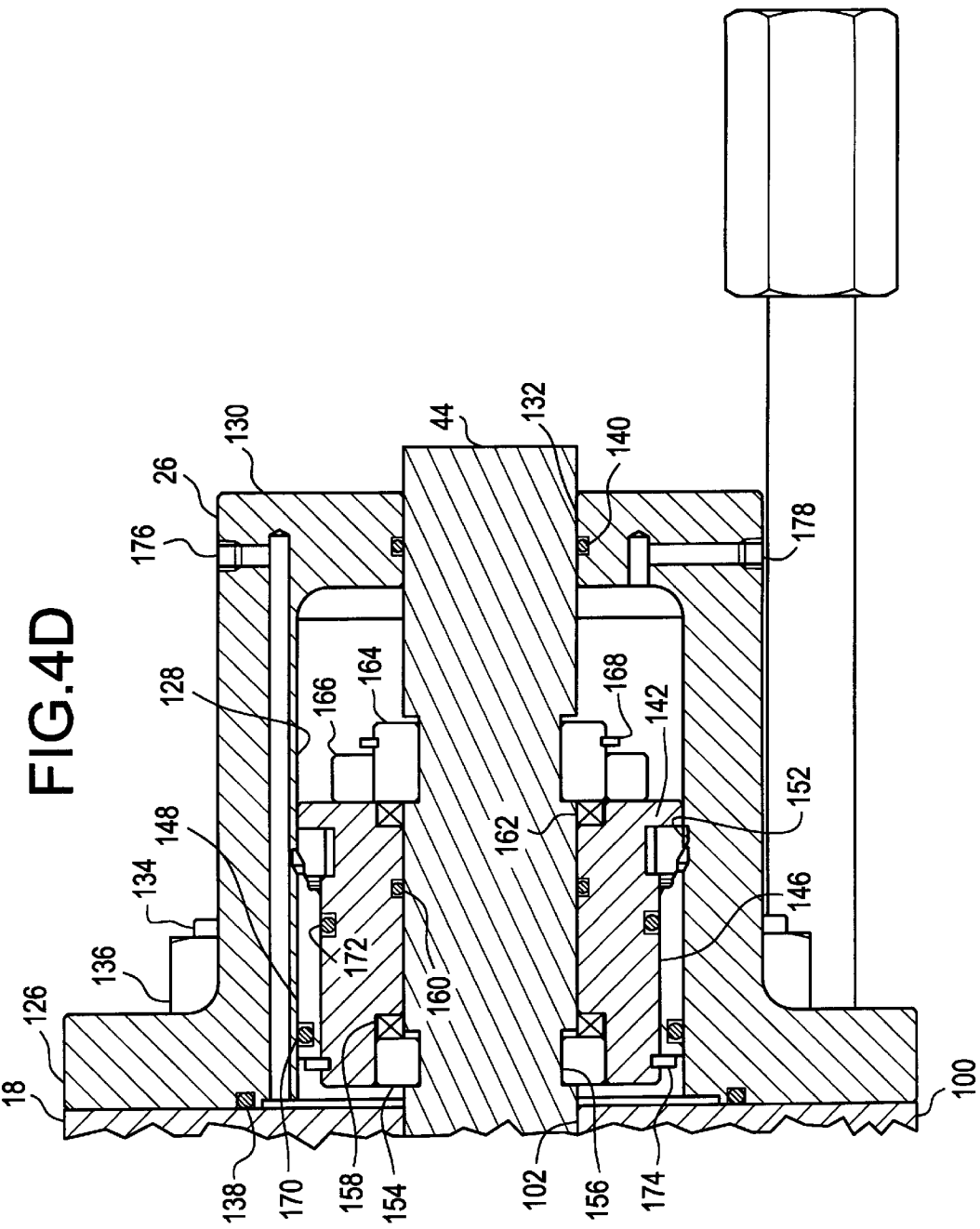

HIGH TORQUE ROTATING ACTUATOR

BACKGROUND OF THE INVENTION

1. Field of the Invention

This invention relates to a rotating actuator for use with valves and chokes that features a driving member with a variable helix angle. This variable helix angle allows the actuator to generate greater torque near the end of its travel when it is needed to close a valve or operate a choke. The high torque rotating actuator lends itself to use with a subsea drilling and production system used in offshore oil and gas wells. This system uses an extension spool between the standard wellhead and production flow package. Flow control valves are positioned in the extension spool. These valves are ball type valves requiring a 90 degree rotation of the valve between the open and closed positions. Since these valves are being used subsea at water depths beyond the access of divers, remote actuation of the valves is required. The high torque rotating actuator of the present invention allows remote operation of the valve and provides additional torque required to operate the valve when it is needed most.

2. Description of the Related Art

U.S. Pat. No. 4,925,154 to G. S. Baker shows a gate valve with a supplemental actuator. The supplemental actuator uses a series of roller cams with the actuator spring to increase the closing force of the actuator during the last portion of its stroke.

A helically shaped cam for operating a gate valve is shown in the brochure entitled "The Cameron ½ 10,000 psi WP Half-Turn Manual Gate Valve". The assignee of the current invention manufactures and sells this valve.

SUMMARY OF THE INVENTION

This invention relates to a rotating actuator for use with valves and chokes that features a driving member with a variable helix angle. This variable helix angle allows the actuator to generate greater torque near the end of its travel when it is needed to close a valve or operate a choke. The high torque rotating actuator is designed for use with valves and chokes and includes a generally cylindrical housing with a valve actuation stem centrally located within the housing. A cylindrical drive bushing has a plurality of helical grooves formed on its exterior and is internally splined to mate with matching splines on the exterior of the stem. An intermediate head is axially adjacent the drive bushing with a central bore through which the stem extends and includes a plurality of longitudinal grooves on its exterior. An annular piston is between the drive bushing and housing. The annular piston is reciprocable within the housing by hydraulic pressure with a series of belleville springs providing a fail safe close power source. The helical grooves on the exterior of the drive bushing have a variable helix angle to provide a greater torque to the stem at the end of the belleville springs travel. The annular piston has two sets of cam rollers on its interior. One set engages the helical grooves of the drive bushing and the second set engages the longitudinal grooves in the intermediate head. When the annular piston is reciprocated by hydraulic force or spring force, the axial motion of the piston is converted to rotary motion by virtue of the helical grooves in the drive bushing. The stem includes an end configuration to mate with a valve and choke and impart the stems rotary motion to the valve or choke.

In a second embodiment, the high torque rotary actuator is configured with the drive bushing inside the intermediate head to give a shorter overall configuration. As in the preferred embodiment, the high torque rotary actuator includes a generally cylindrical housing with a stem coaxially positioned within the housing. The drive bushing is axially adjacent the stem and includes a bore for receiving the stem. An intermediate head is annularly positioned between the drive bushing and the housing with the intermediate head including a plurality of longitudinal grooves. A pressure responsive piston is formed on the stem with the piston reciprocable within a bore formed in the intermediate housing. The drive bushing includes a plurality of helical grooves with a variable helix angle. The stem has two sets of cam rollers on its end. One set engages the helical grooves of the drive bushing and the second set engages the longitudinal grooves in the intermediate head. When the piston is reciprocated by hydraulic force or spring force, the axial motion of the piston is converted to rotary motion by virtue of the helical grooves in the drive bushing. The stem includes an end configuration to mate with a valve or choke and impart the stems rotary motion to the valve or choke.

A principal object of the present invention is to provide a high torque rotating actuator that can generate a higher output torque nearer the ends of its travel than at the beginning.

Another object of the present invention is to provide a high torque rotating actuator that is compact and can be used on tightly spaced subsea tree valve configurations.

A final object of the present invention is to provide a high torque rotating actuator that can be used with valves or chokes.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein:

FIGS. 3A–3D are a sectional view of the high torque rotating actuator connected to a ball valve in the open position.

FIGS. 4A–4D are a sectional view of the high torque rotating actuator connected to a ball valve in the closed position.

DESCRIPTION OF THE PREFERRED EMBODIMENT

Figure 1:
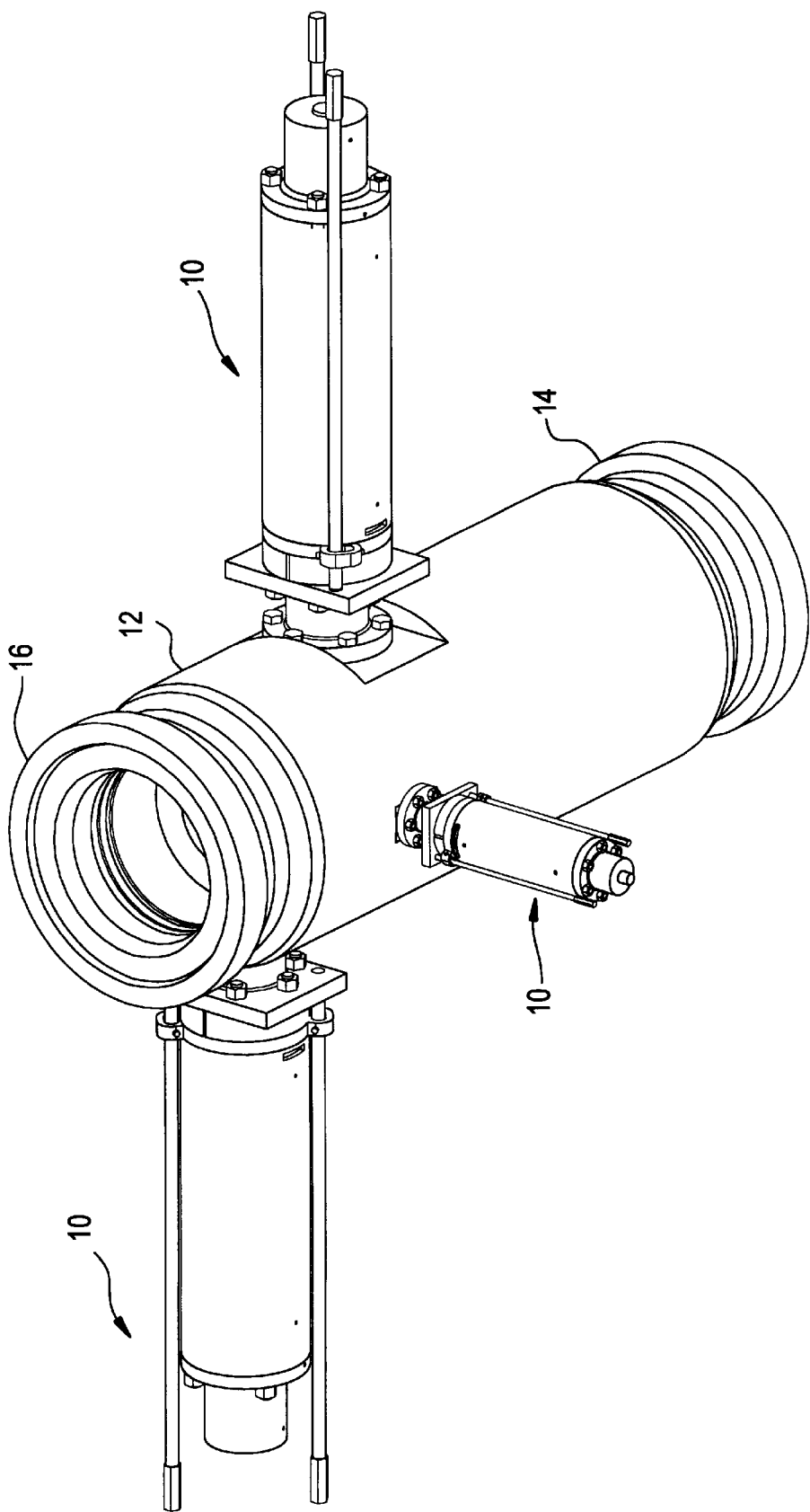
FIG. 1 is an isometric view of an extension spool used in subsea oil and gas drilling operations with high torque rotating actuators of the present invention installed.

With reference to the drawings, and particularly to FIG. 1, high torque rotating actuators 10 of the present invention installed on extension spool 12 are shown in an isometric view. Extension spool 12 is a thick walled tubular member with lower clamp hub end connection 14 and upper clamp hub end connection 16 as shown. In its typical intended use, extension spool 12 would be connected to a wellhead body (not shown) with lower clamp hub end connection 14. Pressure controlling ball valves, not shown, are positioned within extension spool 12. The opening and closing of these ball valves is done by high torque rotating actuators 10 positioned on the exterior of extension spool 12.

Figure 2:
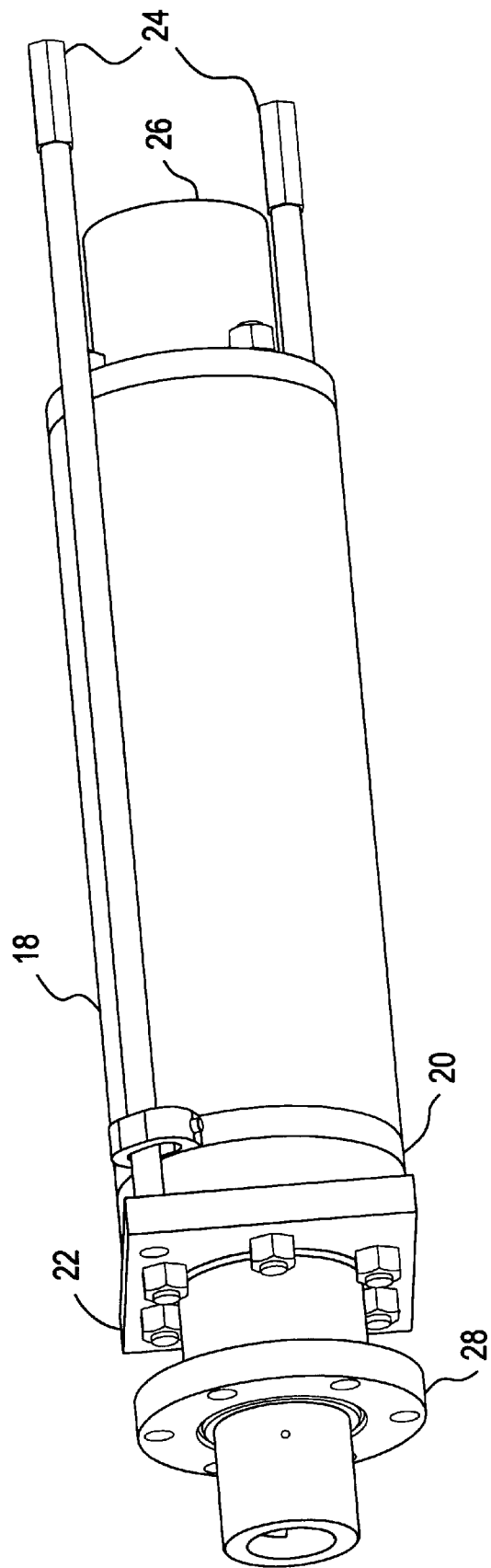
FIG. 2 is an isometric view of the high torque rotating actuator removed from an extension spool.

FIG. 2 is an enlarged isometric view of high torque rotating actuator 10 removed from extension spool 12 to show its overall construction. High torque rotating actuator 10 includes housing 18, intermediate head 20, lower head 22, release rods 24 and release cap 26. Lower head end flange 28 provides a means for connecting high torque rotating actuator 10 to extension spool 12.

Figure 3C:
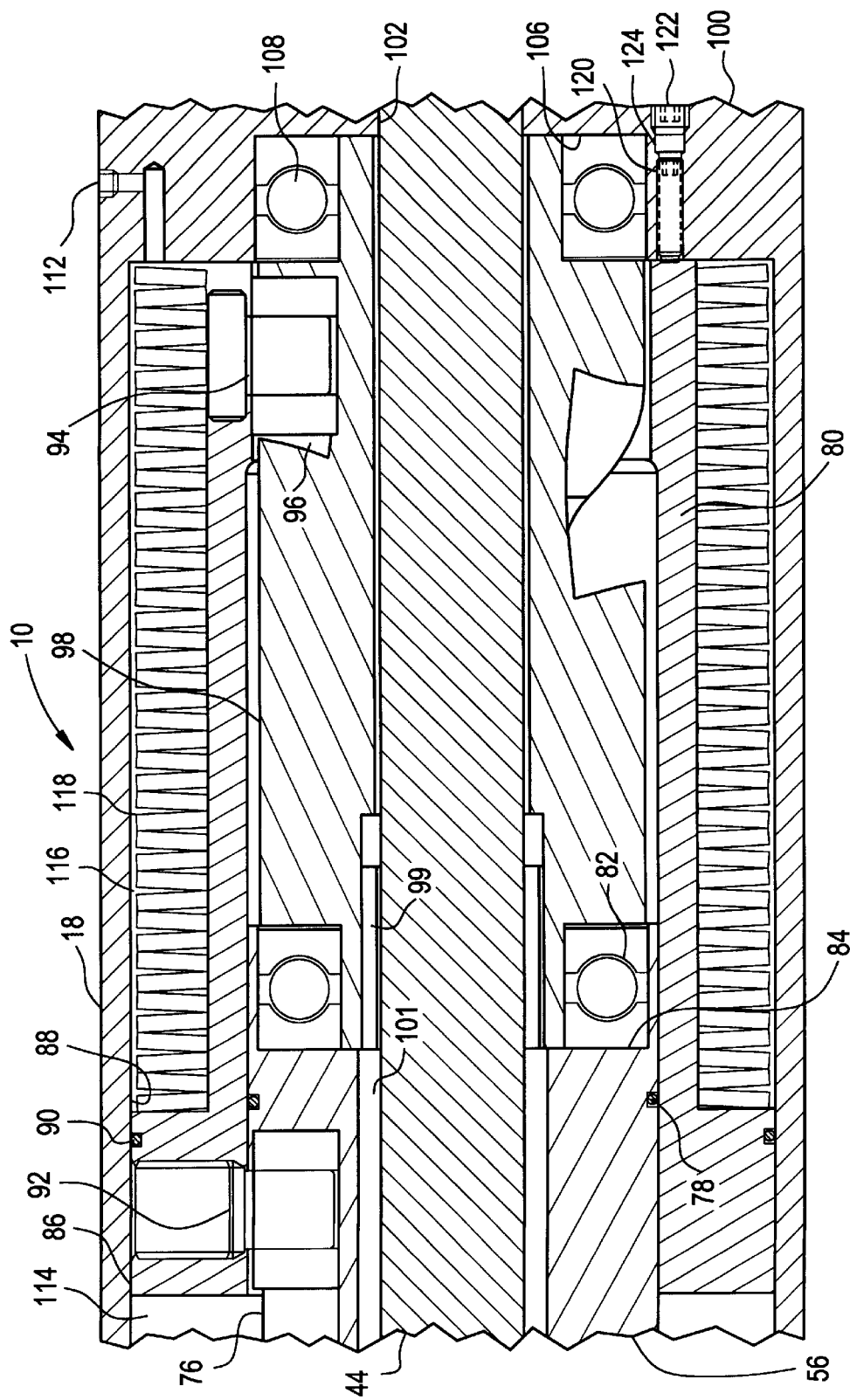

FIGS. 3A–3D are a sectional view of high torque rotating actuator 10 attached to extension spool 12. Referring to FIG. 3A, extension spool 12 is shown partially in section with vertical well bore 30 extending therethrough. Cartridge ball valve assembly 32 is positioned in vertical well bore 30. Cartridge ball valve assembly 32 has vertical bore 34 therethrough with ball 36 positioned therein in the open position allowing flow through vertical bore 34. High torque rotating actuator 10 is secured to extension spool 12 by bolts 38 and flange 40 formed on the end of lower head 22. Seal ring 42 seals the connection between flange 40 and extension spool 12. Stem 44 of high torque rotating actuator 10 extends from lower head 22 and has a keyed end connection 46 to transmit the torque generated by the rotation of stem 44 by high torque rotating actuator 10 in a manner to be described hereinafter. Keyed end connection 46 engages valve stem 48 which in turn is splined to ball 36 to allow rotation of ball 36. Bearing sleeve 50 is retained on stem 44 by ball bearings 52 which are installed through port 54. Ball bearings 52 allow stem 44 to rotate within bearing sleeve 50 which extends into cartridge valve assembly 32 and retains cartridge valve assembly 32 in well bore 30.

Figure 3D:
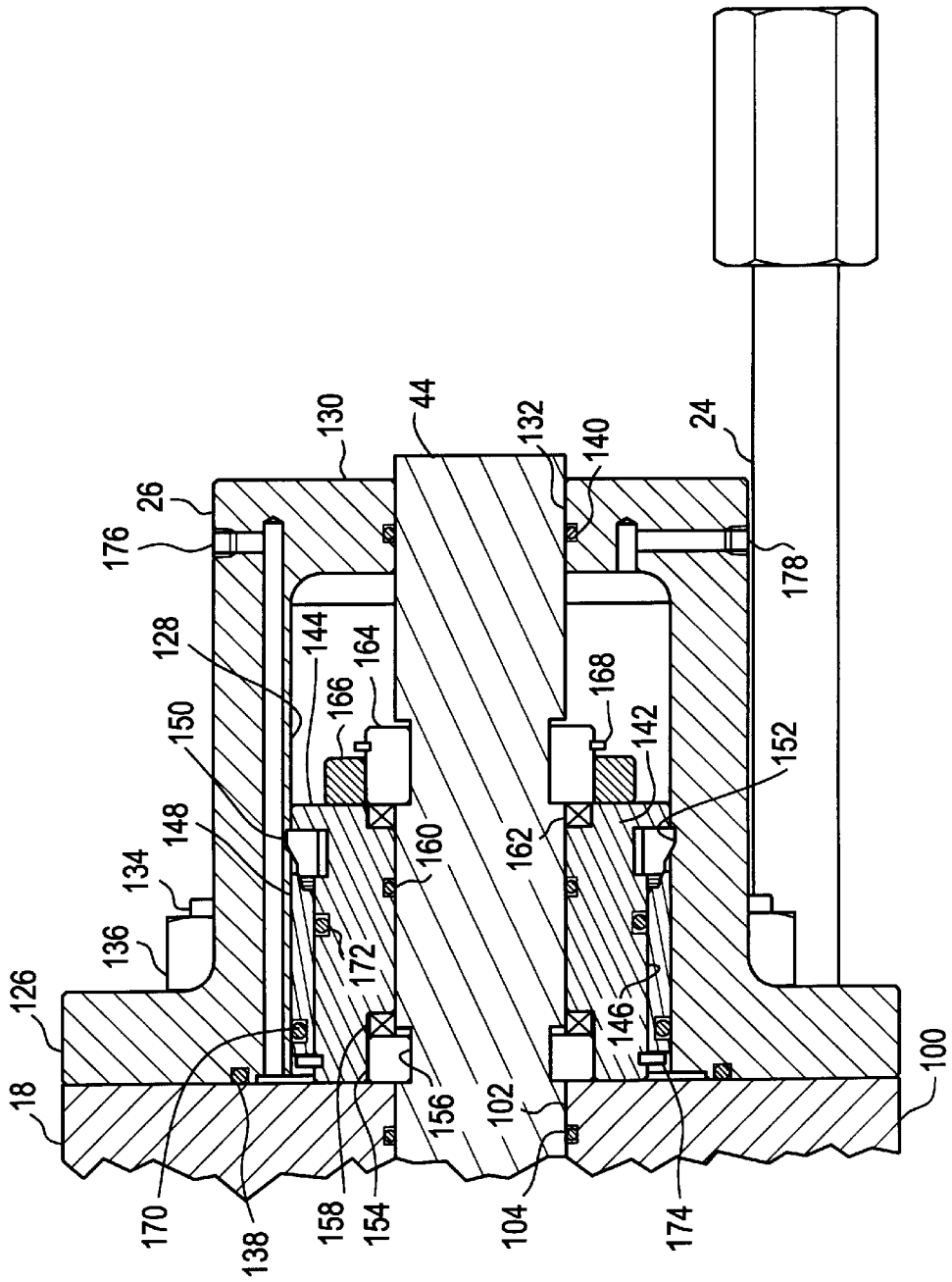
Figure 4A:
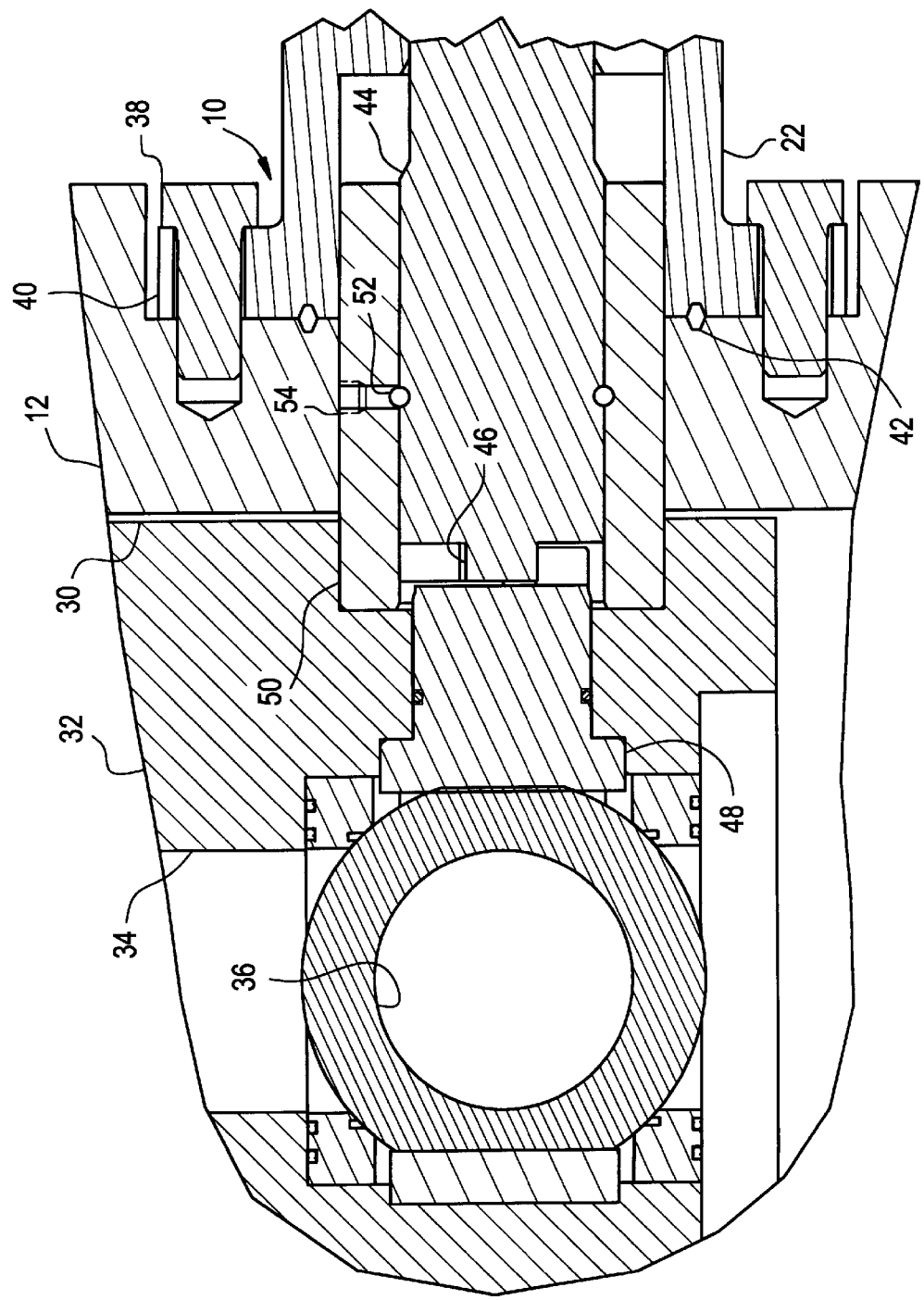
Figure 4C:
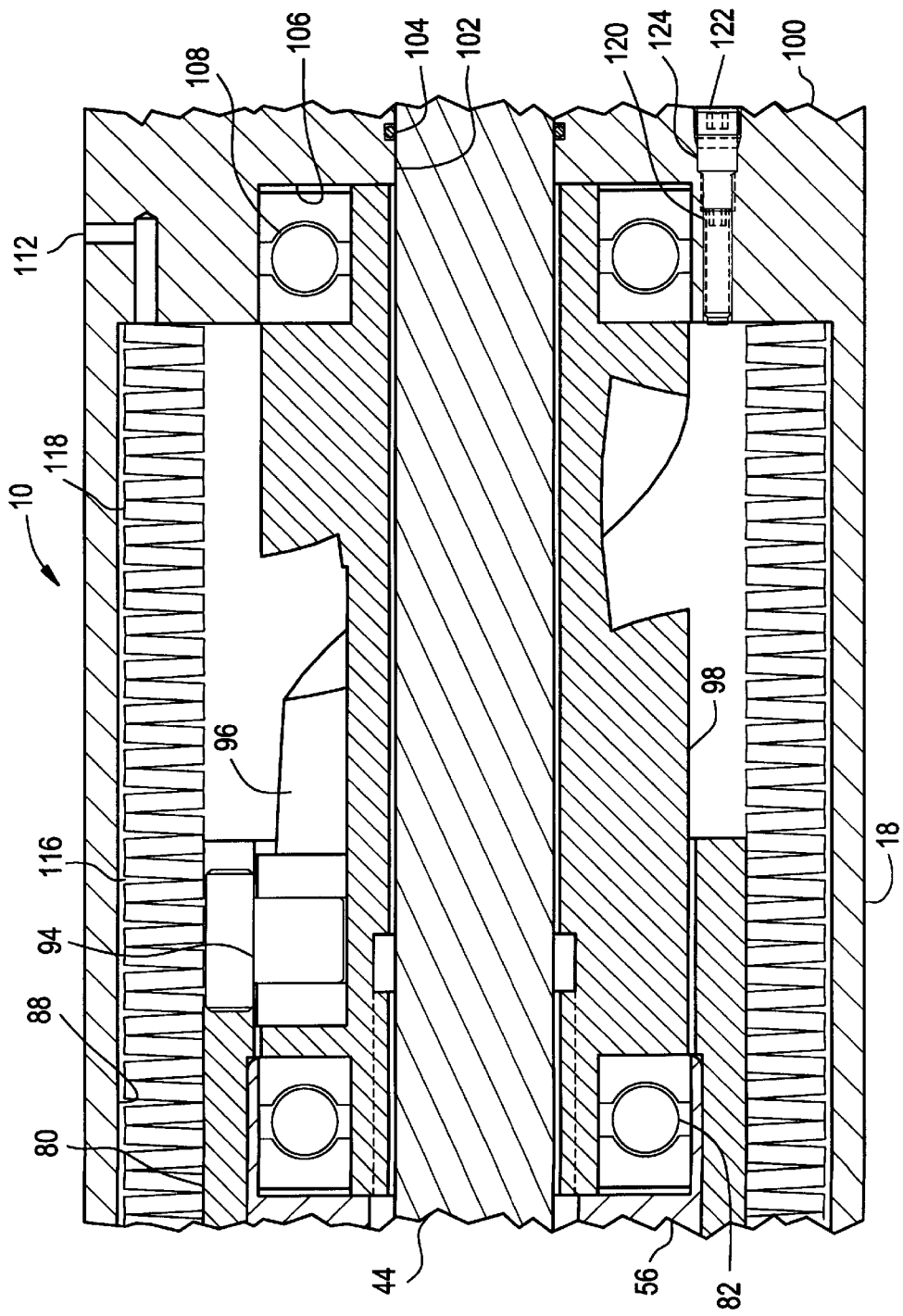

Referring to FIGS. 3B–3D, intermediate head 56 is a generally cylindrical member with upper flange 58 and end flange 60 formed thereon. Retainer ring halves 62, which are L shaped in cross section, secures intermediate head 56 to lower head 22 with studs 64 and nuts 66. Seal recess 68 is formed in the end of lower head 22 with seal element 70 positioned to seal between lower head 22 and stem 44. Upper flange 58 of intermediate head 56 is shaped to receive housing 18 in close fitting engagement. Retainer ring segments 72 secure housing 18 to upper flange 58 and seal element 74 seals the annulus therebetween. Intermediate head 56 includes a plurality of longitudinal slots 76 formed on its exterior for purposes to be explained hereinafter. The opposite end of intermediate head 56 includes seal element 78 on its exterior sealing against annular piston 80. Thrust bearing assembly 82 is positioned in recess 84 on the end of intermediate head 56.

Figure 7:
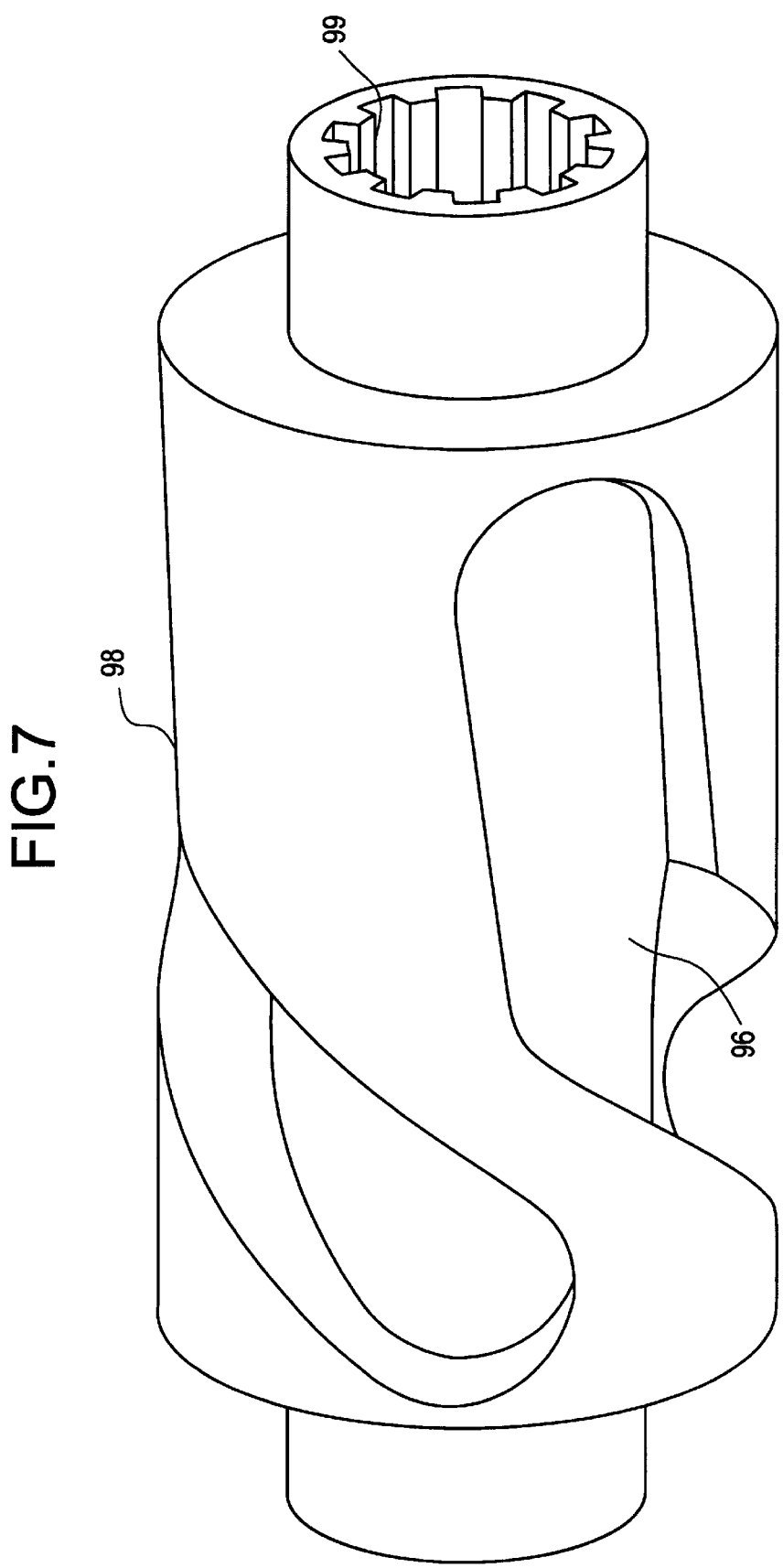
FIG. 7 is an isometric view of the drive bushing showing the variable helix angle grooves.

Annular piston 80 has end flange 86 formed on one end that fits closely within bore 88 of housing 18 and the exterior of intermediate head 56. Seal element 90 seals the annulus between end flange 86 of annular piston 80 and bore 88 of housing 18. End flange 86 receives a radially disposed first engaging means such as cam roller assemblies 92 which extend into longitudinal slots 76 in intermediate head 56. The opposite end of annular piston 80 includes a radially disposed second engaging means such as cam roller assemblies 94 which extend into helically formed slots 96 on drive bushing 98. Drive bushing 98 includes splines 99 (seen more clearly in FIG. 7) which engage mating splines 101 on stem 44.

Housing 18 is a generally cylindrical member with end flange 100 formed on its outer end. Bore 102 on the interior of end flange 100 closely fits about stem 44 that extends therethrough. Seal element 104 seals the annulus between bore 102 of end flange 100 and stem 44. Recess 106 is formed on the interior of end flange 100 and receives thrust bearing assembly 108. Thus, drive bushing 98 is captured between thrust bearing assemblies 82 and 108 and is able to rotate. Housing 18 includes hydraulic ports 110 and 112 to allow hydraulic pressure to be applied to opening chamber 114 and closing chamber 116 for purposes to be explained hereinafter. Closing chamber 116 has an urging means such as belleville springs 118 positioned therein to urge annular piston 80 to its closed position. End flange 100 of housing 18 includes a plurality of set screws 120 equally spaced circumferentially thereabout with a pipe plug 122 at the outer end of each set screw hole 124 for purposes to be explained hereinafter.

Release cap 26 is a generally cylindrical member with inner flange 126 at one end and inner recess 128 extending from inner flange 126 to end cap 130 with bore 132 extending therethrough. Release cap 26 is secured to end flange 100 of housing 18 with studs 134 and nuts 136 with seal ring 138 disposed therebetween. Stem 44 extends through bore 132 with seal ring 140 sealing the annulus therebetween. Release assembly 142 is positioned on stem 44 and locks into inner recess 128. Release assembly 142 includes body 144 closely fitting in the annulus between stem 44 and inner recess 128. Body 144 has a reduced diameter lower section 146 with lock ring 148 disposed in the annulus between body 144 and inner recess 128. Snap ring 150 is positioned on body 144 and is biased to lock into groove 152 on inner recess 128. Split ring 154 is positioned in groove 156 on stem 44 and bearing 158 positioned against split ring 154. Seal ring 160 is positioned on the inner bore of body 144 to seal against stem 44. Bearing 162 is positioned on the opposite end of body 144 and retained by split ring 164, keeper ring 166 and snap ring 168. Lock ring 148 has seal rings 170 and 172 disposed on its exterior and interior, respectively, for purposes to be explained hereinafter and is retained on body 144 by snap ring 174. Pressure ports 176 and 178 supply hydraulic pressure to the interior of release assembly 142 to allow axial movement of stem 44.

Figure 5:
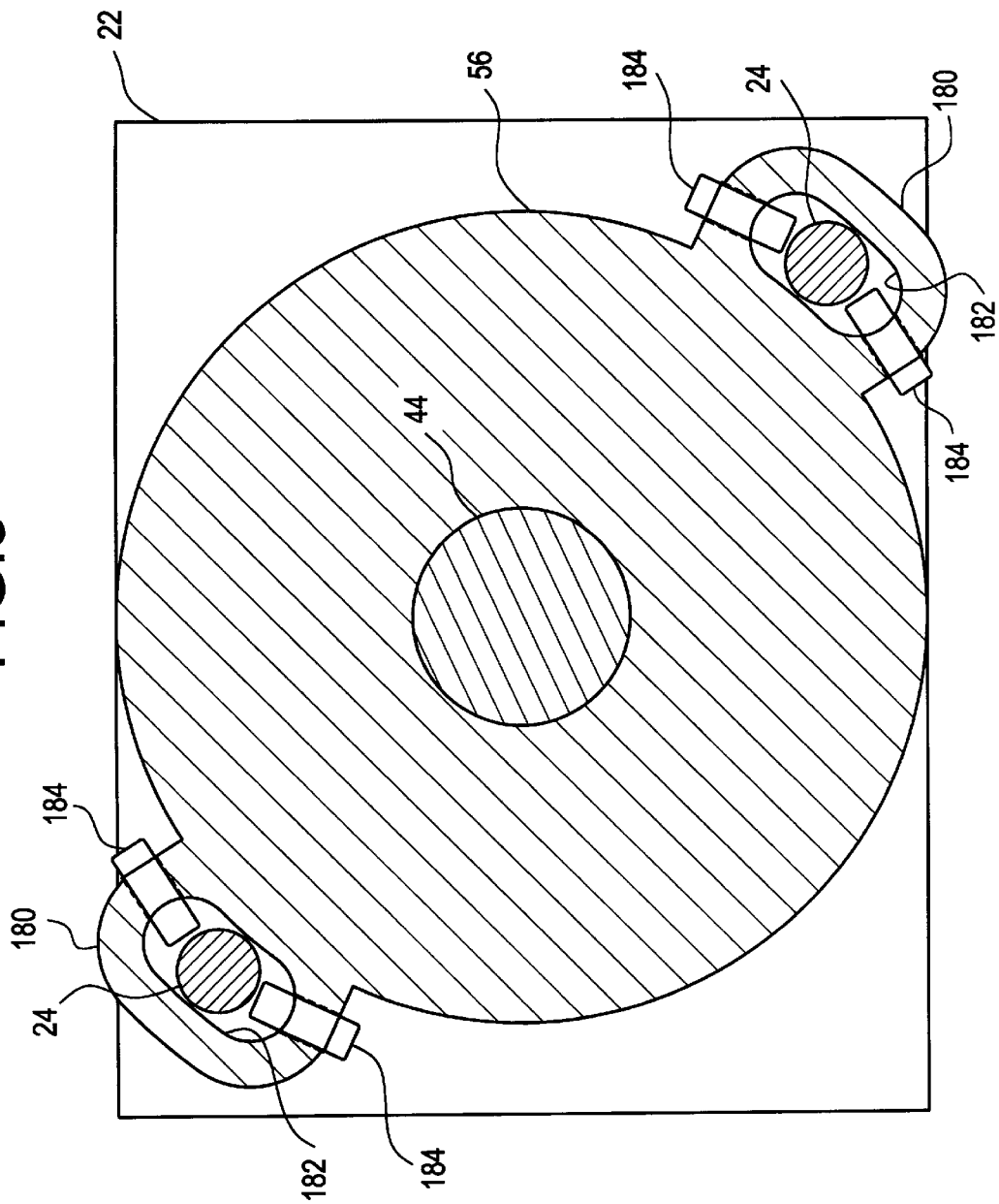
FIG. 5 is a sectional view taken along lines 5—5 of FIG. 3 showing the details of the release rods and intermediate head.
Figure 6:
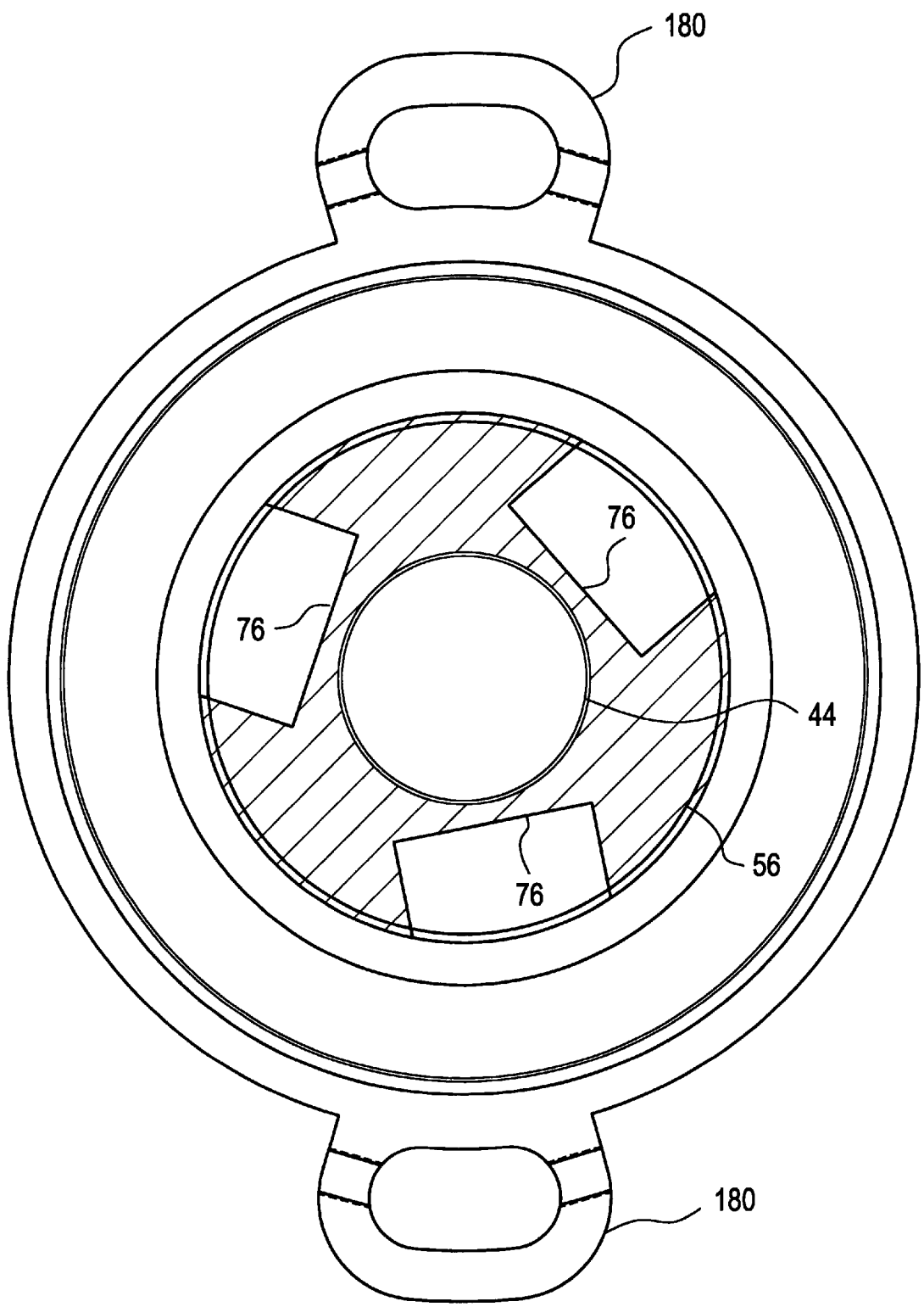
FIG. 6 is a sectional view taken along lines 6—6 of FIG. 3 showing the details of the release rods and intermediate head.

Referring to FIG. 5, a sectional view through high torque rotating actuator 10 shows the interaction of lower head 22, release rods 24, stem 44 and intermediate head 56. Retaining ears 180 are formed on the exterior of intermediate head 56 with an elongated hole 182 therein. Release rods 24 pass through elongated holes 182 and are threaded into lower head 22, as best seen in FIG. 2. Retaining ears 180 are drilled and tapped to receive set screws 184. After attachment of high torque rotating actuator 10 to extension spool 12 and valve 36, high torque rotating actuator 10 is rotated to allow the opening and closing positions of valve 36 to be adjusted. Once the desired adjustments have been made, set screws 184 are locked against release rods 24 to maintain the opening and closing positions of valve 36. Referring to FIG. 6, a sectional view through high torque rotating actuator 10 shows the relative position of stem 44, intermediate head 56 and longitudinal slots 76.

A typical sequence of operations for using the high torque rotating actuator 10 of the present invention is as follows. As noted previously, once the high torque rotating actuator 10 is assembled the relative position of retaining ears 180 and release rods 24 is adjusted. The high torque rotating actuator 10 is then attached by extension spool 12 by bolts 38 and flange 40, making sure the keyed end connection 46 is properly connected to valve stem 48. The next step is setting the open and closed stop positions of ball 36. Hydraulic pressure is slowly applied to valve open port 110 until the ball 36 is fully open and will pass a drift bar. Set screws 120 in end flange 100 are screwed into contact with annular piston 80, preventing further stroking of annular piston 80. In this position the ball 36 is fully open with belleville springs 118 compressed.

When it is desired to close the ball 36 in cartridge ball valve assembly 32, pressure is released from port 110 allowing belleville springs 118 to expand. This expansion force is exerted on annular piston 80 causing cam roller assemblies 92 to travel along longitudinal slots 76. Simultaneously, cam roller assemblies 94 are traveling along helical slots 96 of drive bushing 98 which rotates on thrust bearing assemblies 82 and 108. The rotation of drive bushing 98 is transmitted through splines 99 and 101 to stem 44 and hence to ball 36 thereby closing the valve. Helical slots 96 typically will have two helix angles. The initial angle will be shallow, allowing drive bushing 98 to rotate rapidly with minimal torque for the first 80 degrees of ball rotation. It is envisioned and within the scope of the current invention that helical slots 96 could have several different helix angles that would allow drive bushing 98 to generate a greater torque at a plurality of intervals during its rotation. The cam roller assemblies 94 will then enter the steep portion of helical slots 96, which will increase the torque generated dramatically to close the valve completely, using only the force of belleville springs 118.

In the event of an actuator failure, a remotely operated vehicle ("ROV"), well known to those of ordinary skill in the art, will be used in one of two ways to dose the cartridge ball valve assembly 32. The first and easiest method to ensure closing of cartridge ball valve assembly 32 is to have the ROV "hot stab" pressure port 112 to pressure closing chamber 116 and assist belleville springs 118 in closing the cartridge ball valve assembly 32. In the unlikely event drive bushing 98 is damaged and unable to rotate, the ROV can be used to unscrew release rods 24 from lower head 22. The ROV can then be used to rotate stem 44 and the entire high torque rotating actuator 10. This will allow the stem 44 to rotate ball 36 and close the cartridge ball valve assembly 32.

Should the aforementioned procedures fail to close ball 36, a final resort is to retract stem 44 from cartridge ball valve assembly 32, allowing cartridge ball valve assembly 32 to be retrieved from vertical well bore 30. This is accomplished using either release assembly 142 or release cap 26. Preferably, an ROV "hot stabs" pressure port 176 which causes locking ring 148 to slide onto snap ring 150 thereby disengaging snap ring 150 from groove 152 in release cap 26. Continued application of hydraulic pressure across the annulus sealed by seal rings 104, 160, 170 and 172 causes stem 44 to shift outwardly thereby disengaging from valve stem 48 and allow cartridge ball valve assembly 32 to be retrieved. In the event release assembly 142 fails to function, an ROV can remove nuts 136 securing release cap 26 to housing 18. The ROV can then pull on stem 44 to release cartridge ball assembly 32.

Figure 8:
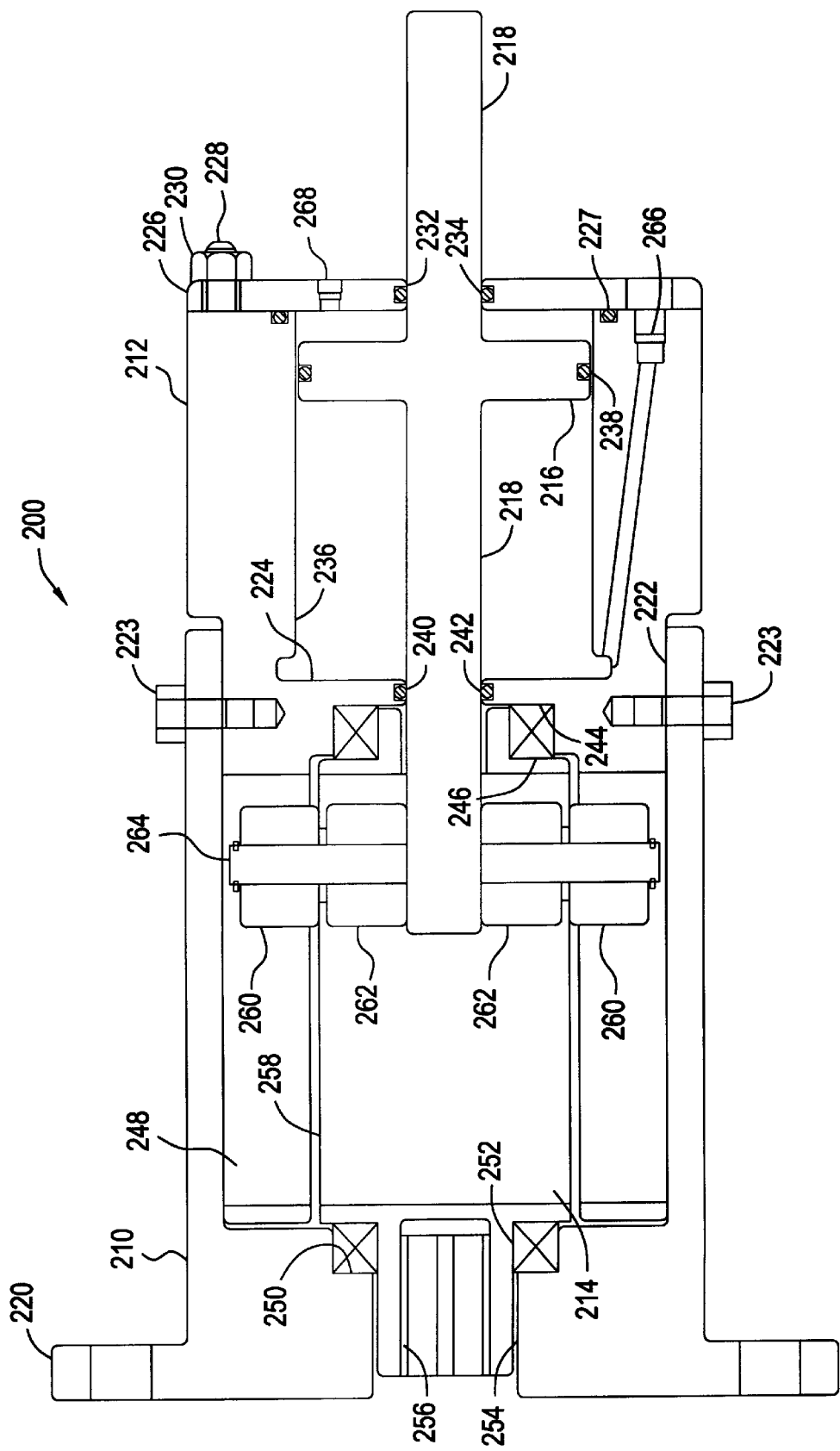
FIG. 8 is a sectional view of the second embodiment of the high torque rotating actuator with the piston in the open position.
Figure 9:
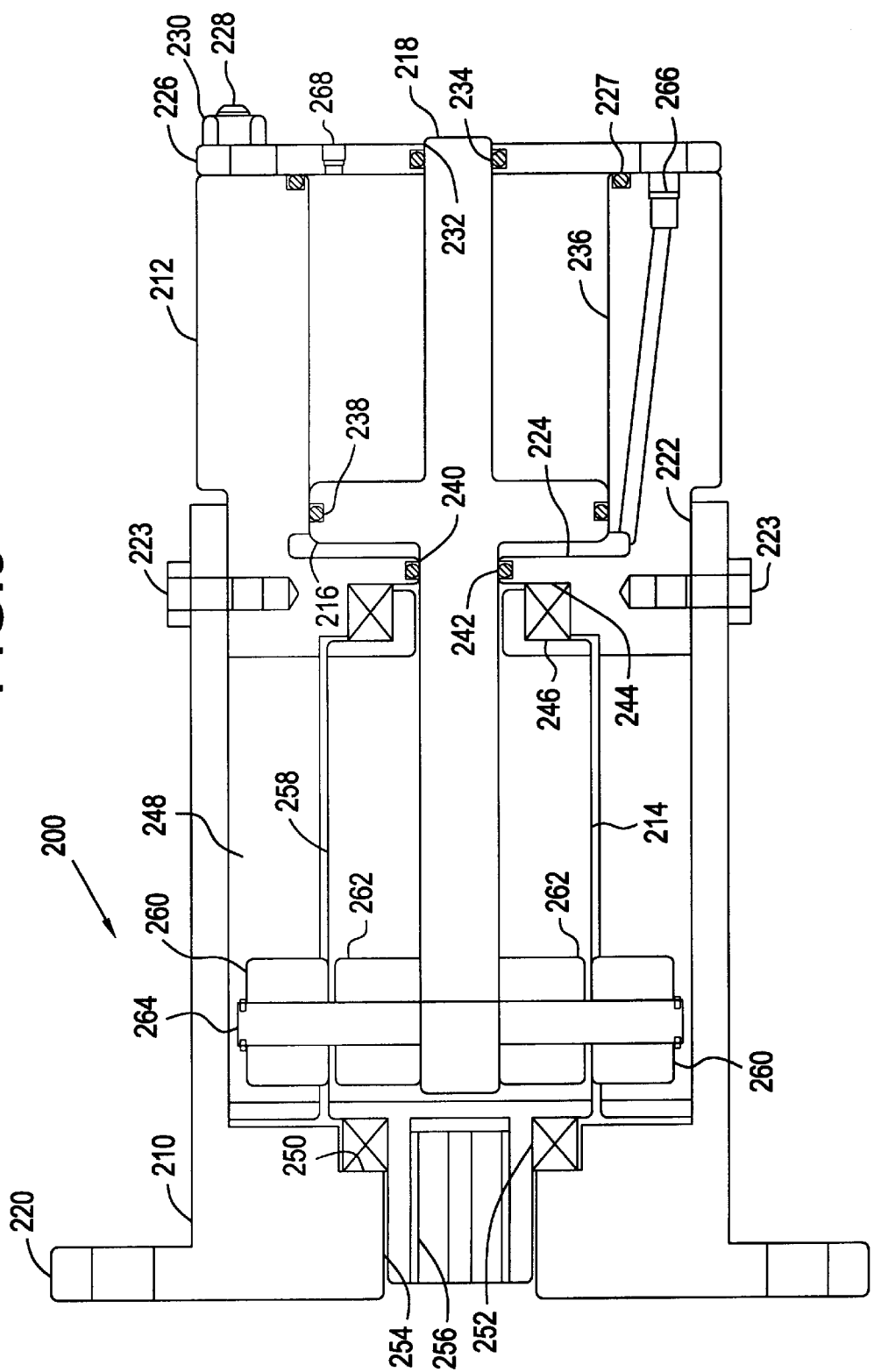
FIG. 9 is a sectional view of the second embodiment of the high torque rotating actuator with the piston in the closed position.
Figure 10:
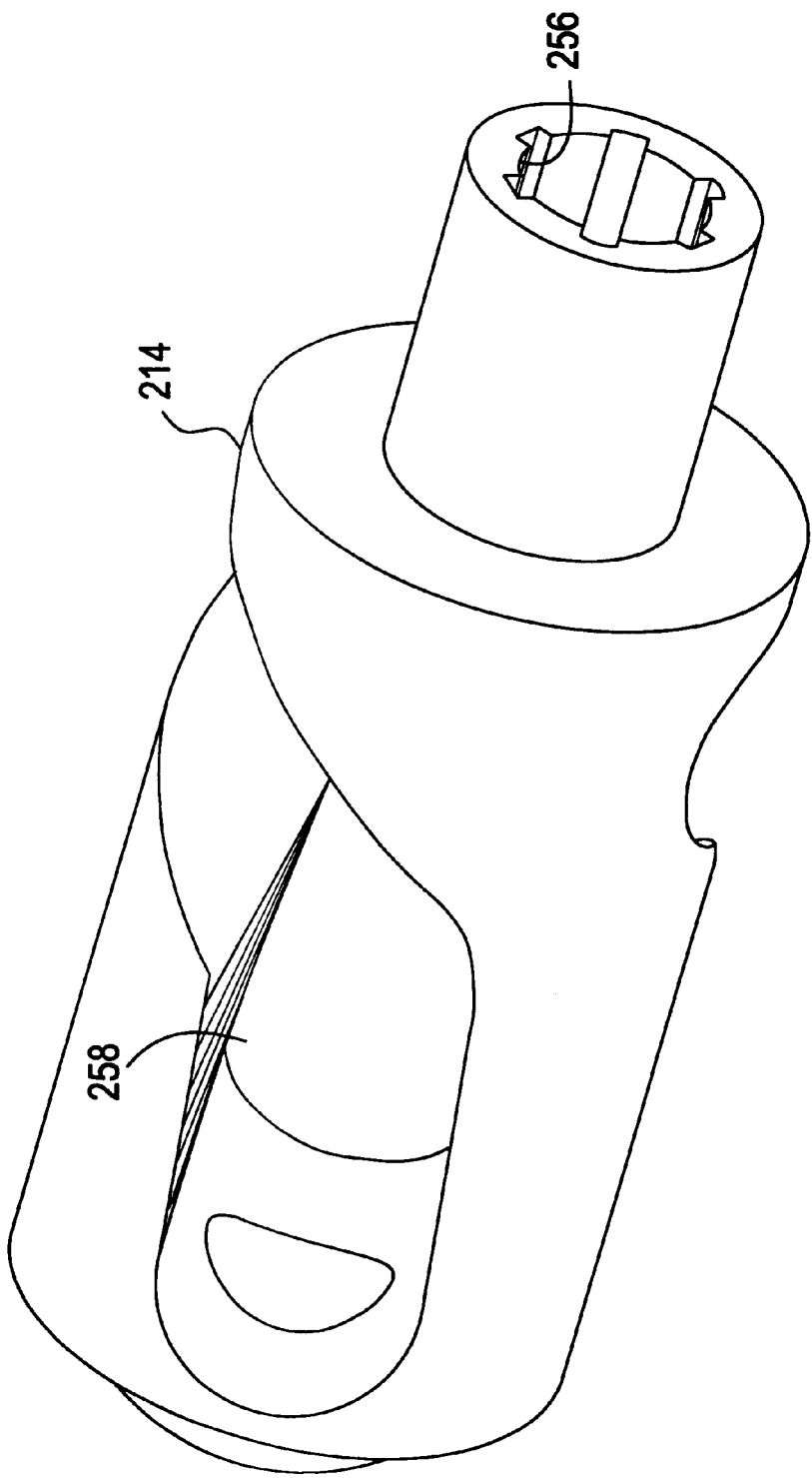
FIG. 10 is an isometric view of the drive bushing of the second embodiment of the high torque rotating actuator showing the variable helix angle grooves.

A second embodiment using the principles of the subject invention is shown in FIGS. 8–10. Rotating actuator 200 is shown in a sectional view and includes housing 210, intermediate head 212, drive bushing 214, and piston 216 formed on stem 218. Housing 210 includes end flange 220 on one end for securing rotating actuator 200 to a valve or choke to be operated. The opposite end of housing 210 has inner recess 222 which receives intermediate head 212 in close fitting engagement. Suitable securing means, such as bolts 223, secure intermediate head 212 to housing 210 and prevent relative rotation therebetween. Intermediate head 212 is a generally tubular member with inner flange 224 formed therein. Intermediate head 212 has end flange 226 positioned at its outer end with seal ring 227 sealing therebetween. End flange 226 is secured to intermediate head 212 by studs 228 and nuts 230. End flange 226 has a bore 232 fitting closely about stem 218 with seal ring 234 sealing the annulus therebetween.

The outer end of intermediate head 212 has inner recess 236 which receives piston 216 in sliding close fitting engagement. Seal ring 238 on the outside of piston 216 seals the annulus between inner recess 236 of intermediate 212 and piston 216. Inner flange 224 has a bore 240 fitting closely about stem 218 with seal ring 242 sealing the annulus therebetween. Inner flange 224 of intermediate head 212 has recess 244 formed on its inner face with thrust bearing 246 positioned therein. A plurality of longitudinal slots 248 are formed on the inner end of intermediate head 212.

Inner recess 222 of housing 210 has a recess 250 formed on its inner face with thrust bearing 252 positioned therein. Housing 210 has bore 254 at its inner end through which valve stem adapter 256 of drive bushing 214 extends. Drive bushing 214 has helical slots 258 (best seen in FIG. 10) cut radially through it. The inner end of stem 218 has a pair of engaging means in the form of cam rollers 260 and 262 attached with cam axle 264. Cam rollers 260 and 262 engage longitudinal slots 248 of intermediate head 212 and helical slots 258 of drive bushing 214, respectively. Pressure ports 266 and 268 provide hydraulic pressure to piston 216 to shift rotating actuator 200 between open and closed positions.

A typical sequence of operations for using rotating actuator 200 of the present invention is as follows. Rotating actuator 200 is moved to the open position by applying hydraulic pressure valve open port 266 which moves piston 218 to the position shown in FIG. 8. When it is desired to close the valve attached to rotating actuator 200 pressure is released from port 266 and pressure is applied to dosing port 268. This force is exerted on piston 216 causing cam roller assemblies 260 and 262 to travel along longitudinal slots 248 and helical slots 258, simultaneously. As cam rollers 260 are restrained in longitudinal slots 248 of intermediate head 212 which is connected to housing 210, cam roller assemblies 262 travel along helical slots 258 of drive bushing 214 causing drive bushing 214 to rotate on thrust bearings 252 and 246. The rotation of drive bushing 214 and valve stem adapter 256 thus causes the valve connected to stem adapter 256 to close. As in the preferred embodiment, helical slots 258 typically will have two or more helix angles to produce the appropriate amount of torque at the appropriate point in the closing of the valve. Similarly, as in the preferred embodiment, it is envisioned and within the scope of the current invention that helical slots 258 could have several different helix angles that would allow drive bushing 214 to generate a greater torque at a plurality of intervals during its rotation.

The construction of our high torque rotating actuator will be readily understood from the foregoing description and it will be seen that we have provided a high torque rotating actuator that is compact and reliable and delivers a higher amount of torque when required to ensure the valve being actuated will fail safe dose. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A high torque rotating actuator, comprising:

a housing;

a stem coaxially positioned within said housing;

a drive bushing engaging said stem;

an intermediate head axially adjacent said drive bushing, said intermediate head including a plurality of longitudinal grooves and said stem extends through said intermediate head;

an annular piston positioned between said drive bushing and said housing, said annular piston reciprocable within said housing by an urging means;

said drive bushing including a plurality of helical grooves, said helical grooves having a variable helix angle; and, said annular piston having first and second engaging means, said first engaging means engaging said helical grooves of said drive bushing and said second engaging means engaging said longitudinal grooves in said intermediate head whereby reciprocation of said annular piston in said housing causes rotation of said drive bushing and said stem.

2. A high torque rotating actuator according to claim 1, wherein:

said variable helix angle of said helical grooves of said drive bushing provides greater torque to said stem at predetermined intervals during the rotation of said drive bushing.

3. A high torque rotating actuator according to claim 2 including:

a lower head positioned axially adjacent said intermediate head;

said lower head having a through bore that receives said stem in close fitting engagement; and, said lower head bore includes a recess receiving sealing means for sealing between said lower head bore and said stem.

4. A high torque rotating actuator according to claim 3, wherein:

said stem extends beyond said lower head and includes an engaging means for engaging a valve closure means and transmitting torque to said valve closure means.

5. A high torque rotating actuator according to claim 4 wherein said piston urging means includes:

said piston being pressure responsive to allow reciprocation within said housing to move said valve closure means between open and closed positions;

a plurality of belleville springs for reciprocating said piston and urging said valve closure means to a closed position without fluid pressure.

6. A high torque rotating actuator according to claim 5 including:

a plurality of release rods attached to said lower head whereby removal of said release rods allows rotation of said housing and said stem to move said valve closure means to a preferred position.

7. A high torque rotating actuator according to claim 6 including:

a release cap releasably secured to said housing opposite said lower head;

said stem extending through said release cap;

said release cap including a pressure responsive piston and release ring annularly disposed about said stem;

said release ring moveable between a first position and a second position in response to fluid pressure applied to said pressure responsive piston;

said release ring preventing axial movement of said stem in said first position; and, said release ring allowing axial movement of said stem in said second position.

8. A high torque rotating actuator according to claim 7 wherein:

said release cap is removeable from said housing when said release ring is in said second position.

9. A high torque rotating actuator according to claim 8 wherein:

said engagement between said drive bushing and said stem is a splined engagement.

* * * * *